United States Patent Office 3,714,124
Patented Jan. 30, 1973

3,714,124
DIMETHYLOL PROPIONIC ACID-UREA-ALDEHYDE RESINS
Jerry Hoyt Hunsucker, % Commercial Solvents Corporation, Terre Haute, Ind. 47803
No Drawing. Continuation-in-part of application Ser. No. 132,225, Apr. 7, 1971, which is a continuation-in-part of application Ser. No. 36,678, May 12, 1970, both now abandoned. This application Nov. 17, 1971, Ser. No. 199,795
Int. Cl. C08g 9/10
U.S. Cl. 260—70 A
11 Claims

ABSTRACT OF THE DISCLOSURE

Resin compositions suitable for baked coatings consisting of the condensation product of a lower aliphatic aldehyde and urea, effected in the presence of dimethylolpropionic acid (DMPA). A method is provided for coating paper with the composition.

CROSS-REFERENCE TO RELATED APPLICATIONS

This application is a continuation-in-part of copending application Ser. No. 132,225 filed Apr. 7, 1971 and Ser. No. 36,678 filed May 12, 1970, and now abandoned.

BACKGROUND OF THE INVENTION

This invention relates to heat-curable resins. In a particular aspect, this invention relates to heat-curable resins suitable for baked finishes.

Urea-formaldehyde resins have been known for many years and many modifications thereof have been disclosed. For example, A. J. Malashevitz et al., U.S. Pat. 3,033,823, disclosed resins modified by a methylol aminomethane and B. Y. Downing, U.S. Pat. 3,464,946, disclosed alkylated urea-formaldehyde resins transetherified with hydroxycarboxylic acids.

Coatings based on urea-formaldehyde resins have many uses, such as in baking compositions for paper and for metal. The preferred resins for this use are acid-curing, prepolymeric, thermosetting resins which are water soluble. Paper coatings in general should be water-white, or nearly so, so that the resin will neither contribute color to the paper nor interfere with the colors of dyes and pigments. One important application for paper coatings is in the manufacture of air filter paper, such as used in air filters for carburetors, and filter papers for diverse applications such as for filtering water, petroleum products, organic solvents, etc. A desirable coating in this use hould contribute good oil resistance and good water resistance. The coated paper should be stiff but not brittle. It is most important that the paper not be clogged but that it remain porous to the passage of air, water, and other liquids.

Paper coatings based on thermosetting urea-formaldehyde resins have been very successful but they have previously suffered from the disadvantage of releasing formaldehyde during the baking step. Formaldehyde vapors are highly irritating and disagreeable and hence it is important to maintain the concentration to as low a level as possible. Furthermore, although these previous coatings have contributed fairly good water-resistance, a need exists for improved coatings in this respect.

Also, it is highly desirable that the aqueous solutions remain stable for at least several weeks to allow ample working time. However, the resin compositions previously used have tended to advance, or "cure," during storage and use resulting in agglomeration of the resin and loss of the coating dispersion as well as paper stock to which it was applied. Accordingly, a need exists for improved stability of aqueous, thermosetting urea-formaldehyde prepolymers.

SUMMARY OF THE INVENTION

It is an object of this invention to provide improved heat-curable resins.

It is another object of this invention to provide improved heat-curable resins suitable for baked finishes.

It is a third object of this invention to provide improved resin compositions which do not yield formaldehyde vapors during the curing step.

It is still yet another object of this invention to provide paper coatings which provide good oil resistance and good water resistance.

It is a fifth object of this invention to provide heat-curable resins suitable for use in metal finishes.

It is a sixth object of this invention to provide aqueous, thermosetting urea-formaldehyde prepolymers having good storage stability.

It is yet another object of this invention to provide a process for an improved coated paper.

Other objects of this invention will be apparent to those skilled in the art from the description herein.

It is the discovery of this invention to provide a water-soluble, heat-curable resin composition, and a process for the preparation thereof, comprising the condensation product of a lower aliphatic aldehyde and urea, the condensation being effected in the presence of 2,2-bis(hydroxymethyl)propionic acid (otherwise known as dimethylolpropionic acid, and hereinafter designated DMPA) and in the presence of from 0–1 mole of an alkanolamine, as hereinafter defined, per mole of urea. Such compositions have especial utility in paper coating compositions and in metal finishes.

In one embodiment of this invention, a portion of the aldehyde is mixed with an aminoalkanediol; the urea is then added thereto, either prior to adding the DMPA or concurrently therewith. The mixture is then heated to effect formation of the prepolymeric, heat-curable (or thermosetting), water-soluble resin. After cooling, the solution is neutralized to about pH 7.0 with an alkylamine, an alkanolamine or aminoalkanediol, or mixture thereof, and preferably a small amount of sodium bisulfite is incorporated therein to stabilize the pH.

DETAILED DISCUSSION

According to the present invention, urea and an aliphatic aldehyde are reacted in the presence of DMPA and a suitable solvent such as water or a lower aliphatic alcohol or a mixture thereof at reflux temperature of about 55° to about 100° C., preferably about 90–100° C., and at a pH of about 7.0 or below, and for a period of time sufficient to effect partial, but not complete, polymerization, thereby forming a water-soluble prepolymer. In a preferred embodiment, the reaction is effected by mixing the urea with the aldehyde in the presence of an alkanolamine or aminoalkanediol corresponding to the formula

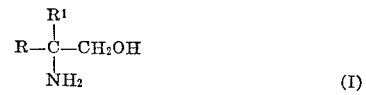

wherein R and $R^1$ can be hydrogen, methyl, or ethyl and can be the same or different, or R, preferably, can be hydroxymethyl, in mole ratio of about 0.3–1:1 of urea. The preferred alkanolamine is 2-amino-2-ethyl-1,3-propanediol. The DMPA can be added after the urea has been completely mixed with the aldehyde, but preferably it is added concurrently with the urea. It is also suitable to add the urea in increments alternately with increments of the DMPA.

When the reaction is complete, the reaction mixture is allowed to cool. The pH is generally about 5 and the water-soluble resin product can be used as is. Preferably—though not necessarily—the pH is adjusted to within about 5 to 8, preferably about 6 to 7, or, for maximum storage stability, between about 6.8 and 7.0, with an alkanolamine corresponding to the above formula, or with an alkyl amine corresponding to the formula

$$R^2-\underset{\underset{R^4}{|}}{N}-R^3 \qquad (II)$$

where $R^2$ is hydrogen and $R^3$ and $R^4$ can be hydrogen, methyl, ethyl, propyl, isopropyl, and butyl and can be the same or different. It is known in the art to adjust the pH of resin dispersions with an alkylamine or secondary or tertiary alkanolamine and any of the amine compounds previously employed can be employed to produce the dispersions of the present invention. Preferably, however, the preferred alkanolamines for adjusting the pH are those corresponding to the foregoing Formula I wherein R is hydroxymethyl. Also, the compound tris(hydroxymethyl)aminomethane is a preferred alkanolamine. The particularly preferred amine is a mixture of 2-amino-2-methyl-1-propanol and 2-amino-2-ethyl-1,3-propanediol in a ratio of about 1:1 by weight.

The resin dispersion so obtained is in concentrated form suitable for storage and shipping. There is a tendency for the pH to drop from about 7 to about 6.0–6.2 during the first 24–48 hours after preparation. This tendency can be controlled by the incorporation of a trace of sodium bisulfite, e.g. about 0.03–0.05% based on the weight of total solids is sufficient. A more concentrated product can be obtained, when desired, by distilling a suitable amount of solvent, e.g. the lower aliphatic alcohols or water, used for preparation of the resin. The distilling step is easily effected without adverse effect on the resin. Preferably, a more concentrated solution can be prepared, when the aldehyde is formaldehyde, by using paraformaldehyde as the formaldehyde source, or a portion thereof.

The term dispersion as used herein is intended to have its usual meaning, namely, a system of minute particles distinct and separate from one another and suspended in a liquid medium. As used herein, the term dispersion is intended to include true solutions as well as colloidal solutions, and it is not intended that the invention be limited thereby.

When pH adjustment has been effected, as hereinbefore set forth, the resin solution can be stored before use or can be used promptly. In either case, before use, the dispersion is diluted with a suitable solvent such as water or a lower aliphatic alcohol, preferably water, to a suitable concentration, e.g. about 20% by weight, as desired and dyes or pigments, etc. are added as, or if, desired. The resulting composition rapidly cures, i.e. completely polymerizes, at elevated temperatures, e.g. from 300 to 400° F., and is suitable for use as a paper coating or for a baking enamel on metal, e.g. steel. Paper coated with this material is oil and water resistant, is stiff but not brittle and remains porous to the passage of air. There is no significant odor of formaldehyde during the heat-curing step.

The urea and aldehyde are generally employed in a mole ratio of, for example, about 1:2–4 respectively, preferably about 1:3–4, as is known in the art. Although, the ratios are not critical and wide departures from the foregoing are permissible, the preferred product is that obtained within the foregoing ratio. The DMPA is generally employed in a ratio of about 0.1–1:1, usually less than about 0.5–1.5 moles of DMPA of 2 moles of urea, preferably about 1:8. The DMPA preferably is not employed at ratios higher than 1.5:2 because the mixture may gel and become unusable. When the reaction is effected in the presence of an alkanolamine, as set forth hereinbefore, the alkanolamine is employed in a mole ratio of about 0.3–1:1 of urea, preferably about 0.3–1. Suitable alkanolamines include, but are not limited to, 2-amino-2-methyl-1-propanol, 2-amino-1-butanol, 2-amino-2-methyl-1,3-propanediol, and 2-amino-2-ethyl-1,3-propanediol.

The reaction mixture is maintained at a pH of about 7 or below, preferably within about 6–7. The acidic pH is provided by the DMPA and when the reaction is conducted in the presence of an alkanolamine, care must be taken to employ sufficient DMPA to provide a pH of 7 or below during the reaction.

In describing that the paper is coated with the resinous material, it is not intended to imply that the coating resides solely on the surface. Obviously the paper absorbs the coating to a greater or lesser extent, i.e. is impregnated therewith.

The DMPA, alkanolamines and urea used in the practice of this invention are commercially available and the usual commercial grades are suitable for preparing the present compositions. Although the invention has been described with reference to DMPA as the preferred acid, it will be readily apparent to those skilled in the art that other hydroxycarboxylic acids can be substituted therefor and are the practical equivalent of DMPA. Accordingly, it is not intended that the practice of the invention be limited to DMPA.

Aldehydes suitable for use in preparing the compositions of the present invention include, but are not limited to, the lower aliphatic aldehydes, e.g. formaldehyde, acetaldehyde, propionaldehyde and butyraldehyde. These aldehydes are commercially available and the usual commercial grades are suitable for the practice of this invention. The formaldehyde can be used as the usual 37% by weight grade or the 44% or higher grades are also suitable, as are the alkanol solutions and paraformaldehyde.

The resins of the present invention have numerous uses in addition to the preparation of high wet strength filter papers. For example, they are useful as core oils in the preparation of molds for sand castings and as cross-linking agents for alkyd-, epoxy- and other hydroxy-functional resins. They are also useful for contributing wrinkle resistance to textiles and for providing shrinkage resistance to textiles.

In addition to the alkanolamines set forth hereinbefore, the present embodiment also contemplates the use of alkanolamines including but not limited to monoethanolamine; 2-amino-1-pentanol; 2-amino-1-hexanol; 2-amino-1-octanol; and 2-amino-1-decanol.

The term prepolymer as used herein is intended to means compounds or mixtures of compounds which form polymers under polymerizing conditions, e.g. at elevated temperatures, but are not necessarily polymeric themselves.

The foregoing description of the invention can be better understood with reference to the following examples. It is understood, however, that the examples are for the purpose of illustration and it is not intended to be limited thereby.

EXAMPLE 1

Urea, 60 g. (1 mole), and formaldehyde, 61 g. (about 2 mole, provided by 165 g. of a 37% solution) and isopropyl alcohol, about 30 g., were charged to a reaction vessel equiped with a thermometer, stirrer and reflux distillation column. The mixture was stirred until the urea dissolved, then DMPA, 134 g. (about 1 mole), was added. The pH was 5.0. The mixture was heated at reflux for 2 hours. It was then cooled and the pH which was 3.8, was adjusted with 2-amino-2-methyl-1-propanol to about 6.0. The product was a water-white resin dispersed in aqueous isopropyl alcohol solution. The viscosity was J, Gardner, and had suitable stability for storage. The resin solution was diluted to 20% by weight with isopropyl alcohol. A sample of uncoated air filter paper was dipped therein. Excess solution was removed by passing the paper through a roller press. It was then baked at about 190° C. for about 4 minutes. No odor of formaldehyde was apparent. The resulting coated paper was oil and water resistant, free from brittleness and remained porous to the passage of air.

A sample of the 20% resin solution was applied to a steel panel as a 1.5 mil wet film using a draw down bar. It was then baked at 210° C. for 4 minutes. The resulting coated steel panel passed a 3/16" mandrel and had a 3H pencil hardness.

EXAMPLE 2

Urea, 30 g. (0.5 mole), formaldehyde, 59.2 g. (160 g. of 37% aqueous solution, about 1 mole), methanol, 45 g., and 2-amino-2-ethyl-1,3-propanediol (AEPD), 59.5 g. (about 0.5 mole) were charged to a reaction vessel equipped with a stirrer, reflux condenser and thermometer. The pH was 6.0. The mixture was heated at reflux temperature for an hour, with continuous stirring, then dimethylolpropionic acid, 33.5 g. (about 0.25 mole) was added and heating was continued at reflux (about 55° C.) for another hour. The mixture was then allowed to cool. It had a pH of 4.7. It was neutralized to a pH of about 6.5 with 2-amino-2-ethyl-1,3-propanediol giving a dispersion of resin in aqueous methanol. The color was 3, Gardner, and the viscosity was A. It was suitably stable for storage.

The solution was diluted to 20% by wt. with methanol and applied to air filter paper by dipping. Excess solution was removed by putting the paper through a roller press. It was then baked at 350° F. for 1½ minutes. No odor of formaldehyde was apparent during the baking step. The resulting coated paper was determined to be particularly suitable for use as filter paper.

EXAMPLE 3

The experiment of Example 1 was repeated in all essential details except that 67 g. of DMPA (about 0.5 mole) was substituted for 1 mole, and 111 g. of butanol was substituted for isopropyl alcohol. The pH was 5.0. After heating at reflux for 2 hours, 98 ml. of the water-butanol azeotrope was separated by distillation over a period of 1.5 hours. The mixture was then cooled and the pH was adjusted to about 6.5 with 2-amino-2-ethyl-1,3-propanediol. There was obtained a 51% by weight dispersion of resin in aqueous butanol. It had a color, Gardner, of 1, a viscosity, Gardner, of G to H, and an acid value of 87. The solution was then diluted to 20% by weight with butanol. The solution before dilution was suitably stable for storage.

A sample of air filter paper was coated by the procedure of Example 1 and was baked at 350° F. for 15 minutes. No odor of formaldehyde was apparent. The resulting paper had good oil and water resistance, was not brittle and was porous to the passage of air.

EXAMPLE 4

The experiment of Example 2 was repeated in all essential details except 55 g. of butanol was substituted for methanol and 22 g. of acetaldehyde (0.5 mole) was substituted for AEPD.

After the DMPA was added, heating at reflux was continued for another hour, as before, then 63 ml. of butanol-water azeotrope was removed by distillation, and another 126 g. of butanol were added. Heating was continued for 50 minutes and another 126 ml. portion of butanol-water azeotrope was removed by distillation. The reaction mixture was then cooled and the pH was adjusted to about 6 with AEPD. There was obtained a solution of resin in butanol having a Gardner viscosity of A–3, and a Gardner color of 1. It was diluted to 20% with butanol. The solution before dilution was suitably stable for storage.

A sample of air filter paper was coated with the above product and was baked at 350° F. for 15 minutes. There was no apparent odor of formaldehyde. The coated paper was oil and water-resistant and was non-brittle.

A sample of the coating was applied to steel sufficient to provide a 1.5 mil thickness of wet film, then baked at 350° F. for 15 minutes. The resulting film was clear and colorless and had a 9H pencil hardness. It passed a ⅛" mandrel test.

EXAMPLE 5

The experiment of Example 2 was repeated in all essential details except that isobutyl alcohol was substituted for n-butanol.

After adding the DMPA, heating at reflux was continued for one hour. Then, over a period of 45 minutes, 115 ml. of the isobutyl alcohol-water azeotrope was removed and the resin solution was then cooled. It had a color, Gardner, of 3 and a viscosity of A.

The above reaction mixture was diluted to 20% with isobutyl alcohol and applied to filter paper as before. It was then baked at 350° F. for 2 minutes and produced a water and oil-resistant coating. On steel, it was clear and colorless and had a 9H pencil hardness.

EXAMPLE 6

The experiment of Example 1 was repeated in all essential details except than 90 g. urea (1.5 mole), 25 g. DMPA (about 0.2 mole), 177 g. AEPD (about 1.5 mole) and 1200 g. isopropyl alcohol were used. The pH was 5.0. The mixture was heated under reflux for 45 minutes. The pH was then adjusted to about 6.2 with AEPD and diluted to 20% with isopropyl alcohol. It was determined that it was suitable for use as a paper coating.

EXAMPLE 7

Formaldehyde, 37% solution, 2550 parts by weight (943.5 parts, 100% basis, or 31.45 mole equivalents) was charged to a reaction vessel equipped with an agitator, a means for heating and cooling, and a temperature measuring means. There was added thereto with agitation, 2-amino-2-ethyl-1,3-propanediol (AEPD), 350 parts (2.94 molar equivalents), urea, 540 parts (9 molar equivalents) and 2,2-dimethylolpropionic acid 150 parts (1.12 molar equivalents). The pH was 5.0. The mixture was heated to 90° C. for 30 min. and then allowed to cool to room temperature. The resin solution thereby obtained was about 50% by weight. The pH, which was adjusted to within 6.0–6.4 with a mixture, 1:1 by weight, of 2-amino-2-methyl-1-propanol (AMP) and AEPD, about 50 parts per 1000 parts of resin. The solution was suitably stable for storage.

The free formaldehyde content was less than 2%. The solution had a viscosity, Gardner, of A⁻ and a color, Gardner, less than 1. It was a clear solution having only slight odor and yielded a cured film upon baking for 2 min. at 350° F.

This resin solution was used to impregnate paper which was then dried and stored for 4 months at room temperature. When heated to 350° F., the resin cured promptly.

EXAMPLE 8

Formaldehyde, 37% by wt., 1050 parts (388.5 parts 100%, 12.9 mole equivalents) and paraformaldehyde 553 parts (18.4 molar equivalents) were charged to a reaction vessel as described in Example 7. AEPD, 350 parts (2.94 molar equivalents) was added and the mixture was heated at 90° C. until clear. The mixture was allowed to cool to 80° C. then urea, 540 parts (9 moles) was added with agitation and then DMPA, 150 parts (1.12 moles) was gradually added at a rate sufficient to maintain the temperature below about 85° C. The resulting solution contained approximately 75% by wt.

resin. The pH, which was 5.0, was adjusted as in Example 7 and the solution was ready for storage or use. The solution was suitably stable for storage.

The free formaldehyde content was less than 2%. The solution had a viscosity, Gardner, of A⁻ and a color, Gardner, less than 1. It was a clear solution having only slight odor and yielded a cured film upon baking for 2 min. at 350° F.

EXAMPLE 8A

The experiment of Example 8 was repeated in all essential details except that the 37% formaldehyde solution was omitted and 942 parts (31.4 moles) of paraformaldehyde was used, and a reaction solvent mixture of 500 parts of water and 100 parts of methanol were charged to the kettle before adding the solid ingredients. The resin concentration before neutralizing was 70% by weight.

The free formaldehyde content was less than 2%. The solution had a viscosity, Gardner, of A⁻ and a color, Gardner, less than 1. It was a clear solution having only slight odor and yielded a cured film upon baking for 2 min. at 350° F.

EXAMPLE 8B

A resin solution prepared according to Example 7 was adjusted to pH 7.0 immediately after preparation with a 1:1 AMP-AEPD mixture; 24 hours later the pH was 6.2 and thereafter remained steady. However, after a few weeks storage, an insoluble fraction separated from solution, thus indicating that the acidity was causing further polymerization of the resin which was adverse for impregnating paper.

A fresh supply of resin solutions was prepared and neutralized to pH 7.15. It was divided into 6 portions and varying amounts of sodium bisulfite were dissolved therein. The solutions were stored at room temperature for 60 days and the pH was monitored. The results are summarized as follows:

| Sample No. | NaHSO₃, percent based on resin | pH after storage period of— | | | | | | |
|---|---|---|---|---|---|---|---|---|
| | | 0 day | 1 day | 2 days | 6 days | 15 days | 30 days | 60 days |
| 1 | 0.0 | 7.15 | 6.25 | | | | | |
| 2 | 0.025 | 7.15 | 7.15 | 7.2 | 7.0 | 7.0 | 7.0 | 6.9 |
| 3 | 0.050 | 7.15 | 7.15 | 7.2 | 6.9 | 7.0 | 7.0 | 6.9 |
| 4 | 0.10 | 7.15 | 7.15 | 7.2 | 6.9 | 7.0 | 7.0 | 6.9 |
| 5 | 0.15 | 7.15 | 7.15 | 7.2 | 6.9 | 7.0 | 7.0 | 6.9 |
| 6 | 0.20 | 7.15 | 7.15 | 7.2 | 6.9 | 7.0 | 7.0 | 6.9 |

EXAMPLE 8C

Formaldehyde, 338.7 lb. of a 37% solution (125.3 lb., 100% basis, 4.17 lb. moles) was charged to a reaction vessel. 2-amino-2-ethyl-1,3-propanediol (AEPD), 112.9 lb. (0.947 lb. mole) and paraformaldehyde, 180.6 lb. (6.02 lb. moles) were added thereto. The mixture was heated at 90° C. with agitation until clear, about 2 hours. It was cooled to 80° C. and urea 174.2 lb. (2.9 lb. moles) was added in 50 lb. increments alternately with DMPA 48.4 lb. (0.36 lb. mole) in 15 lb. increments. The mixture was again heated at 90° C. until clear, about 30 minutes. The mixture was allowed to cool and meanwhile 145.2 lb. of a 1:1 by wt. mixture of AMP and AEPD was added incrementally over a 2-hour period. The pH was finally adjusted to within 6.8-7.1 with additional AMP-AEPD mixture. A 50% aqueous solution of sodium bisulfite, 0.48 lb., was added and the resulting mixture was agitated for 2 hours.

EXAMPLE 9

To a reaction vessel equipped with a distillation column, a heat source, an agitation means and a temperature sensing means, there were delivered 75 lb. of urea, 350 lb. of 37% formaldehyde solution, 48 lb. of AEPD, and 21 lb. of DMPA. No additional solvent was added. The mixture was stirred for 15 min. and the ingredients all dissolved readily in the water accompanying the formaldehyde.

The mixture was gradually heated and after about 1 hour the temperature was 193° F. and reflux conditions had become established. After heating under reflux for about 40 minutes, take-off of water was started. Four hours after reflux had started, 120 lb. of water had been removed and the reaction was determined to be complete. The mixture was allowed to cool to ambient temperature and the solids content was determined to be 73.1% by weight. The pH was 5.2.

To the foregoing solution or dispersion there was added 65 lb. AEPD and the resulting pH was 6.8. After standing overnight the pH was 6.0. The resin solution had the following additional properties:

| | |
|---|---|
| Solids, by wt. | 70%. |
| Density | 10 lb./gal. |
| Acid value | 3. |
| Color, Gardner | 2. |
| Viscosity, Gardner | >A. |
| Free formaldehyde | 1.3%. |
| Turbidity | Clear. |
| Odor | None. |
| Solubility in water | Miscible. |
| Water resistance | No odor of formaldehyde after 1 hour in boiling water. |

The resin obtained in the foregoing experiment is used in a process for the manufacture of air filter paper. A portion of the above resin solution is diluted to use concentration by adding a sufficient quantity of water to yield 20% by weight of solids. A piece of paper of the type used for the manufacture of air filters for automobile carburetors is immersed in the diluted resin solution to absorb an excess amount of dispersion, then passed through a pair of rollers to express excess solution. The coated, or impregnated, paper so obtained is allowed to dry. There is no odor of formaldehyde during the drying step.

After drying, the coated paper is crinkled into accordion-type folds by methods known in the art. The crinkled paper is then heated in an oven at 350° F. for about 2.0 minutes. The resulting coated paper is then suitable for use in air filters for carburetors. There is no odor of formaldehyde during the heating step.

EXAMPLE 10

A coated filter paper suitable for use in filtering oil containing particulate matter is prepared by the method of Example 9 using the resin solution of Example 9 except that a grade of paper suitable for filtering oil is substituted for the air filter paper.

EXAMPLE 11

A coated filter paper suitable for use in filtering water containing particulate matter is prepared by the method of Example 9 using the resin solution of Example 9 except that a grade of paper suitable for filtering water is substituted for the air filter paper.

I claim:
1. A heat-curable water-soluble, prepolymer composition neutralized with an alkylamine or an alkanolamine comprising the condensation product at a pH of 7.0 or below of urea and a lower aliphatic aldehyde in the presence of 2,2-dimethylolpropionic acid and from 0–1 mole per mole of urea of an alkanolamine corresponding to the formula

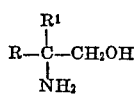

wherein R and R¹ are the same or different and are selected from the group consisting of hydrogen, methyl and ethyl and R can additionally be hydroxymethyl.

2. The composition of claim 1 wherein the 2,2-dimethylolpropionic acid is present in a ratio of about 0.5 to 1.5 moles per 2 moles of urea.

3. The composition of claim 1 wherein the 2,2-dimethylolpropionic acid is present in a ratio of about 0.1–1 mole per mole of urea.

4. The composition of claim 3 wherein the 2,2-dimethylolpropionic acid is present in a ratio of about 1 mole per 8 moles of urea.

5. The composition of claim 1 wherein said alkanolamine is present in an amount of from about 0.3–1 mole per mole of urea.

6. The composition of claim 1 wherein the pH is within the range of about 6 to about 7.

7. The resin composition of claim 1 wherein said aldehyde is acetaldehyde.

8. The composition of claim 1 wherein said aldehyde is formaldehyde.

9. A process for the preparation of the composition of claim 1 comprising the steps of (a) reacting urea and an aliphatic aldehyde at a pH of 7.0 or below in a mole ratio of about 1–2:4 respectively in the presence of from 0 to 1 mole per mole of urea of an alkanolamine and from 0.1–1 mole of 2,2-dimethylolpropionic acid per mole of urea, said alkanolamine corresponding to the formula

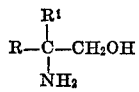

wherein R and $R^1$ are the same or different and are selected from the group consisting of hydrogen, methyl and ethyl and R can additionally be hydroxymethyl, and (b) heating at reflux temperatures within about 55–100° C. at a pH of about 7 or below in the presence of water or a lower alkanol solvent, and neutralizing same.

10. The process of claim 9 wherein the pH of said product is adjusted to about 6 or 7.

11. The process of claim 9 wherein said formaldehyde is mixed with said alkanolamine and the urea and 2,2-dimethylolpropionic acid are added concurrently thereto.

References Cited

UNITED STATES PATENTS

| | | | |
|---|---|---|---|
| 2,352,552 | 6/1944 | Kienzle | 260—70 X |
| 2,554,475 | 5/1951 | Sven et al. | 260—70 X |
| 2,561,973 | 7/1951 | Cohen | 260—70 X |
| 2,626,251 | 1/1953 | James et al. | 260—70 |
| 2,657,132 | 10/1953 | Daniel et al. | 260—70 X |
| 2,917,411 | 12/1959 | Kress | 260—70 X |
| 3,355,430 | 11/1967 | Remley et al. | 260—70 |
| 3,464,946 | 9/1969 | Downing | 260—70 X |
| 2,582,840 | 1/1952 | Maxwell | 162—166 X |

OTHER REFERENCES

Amino Resins, Blais, 1959, pp. 16–17.
Chem. Abstracts, vol. 48, 1954, 9748d, Ohshima.
Chem. Abstracts, vol. 55, 1961, 25354h–i, 25355a, Lenz et al.

HOWARD E. SCHAIN, Primary Examiner

U.S. Cl. X.R.

117—132 BF, 155 L, 161 LN; 260—29.4 R, 33.4 R, 70 R

PO-1050
(5/69)

UNITED STATES PATENT OFFICE
CERTIFICATE OF CORRECTION

Patent No. 3,714,124          Dated January 30, 1973

Inventor(s) Jerry Hoyt Hunsucker

It is certified that error appears in the above-identified patent and that said Letters Patent are hereby corrected as shown below:

```
Column  1, line  53, "hould" should be --should--.
    "   4,  "    54, "means" should be --mean--.
    "   4,  "    68, "equiped" should be --equipped--.
    "   6,  "    29, "than" should be --that--.
    "  10, claim 11, line 1, "formaldehyde" should be
                            --aldehyde--.
```

Signed and sealed this 18th day of December 1973.

(SEAL)
Attest:

EDWARD M. FLETCHER, JR.      RENE D. TEGTMEYER
Attesting Officer               Acting Commissioner of Patents